No. 849,476. PATENTED APR. 9, 1907.
G. N. HINCHMAN.
ADDING MACHINE.
APPLICATION FILED MAR. 24, 1906.

WITNESSES:
Fred C. Henke
W. H. Alexander

INVENTOR
G. N. Hinchman
BY
Knight & Bryson
ATTORNEYS

No. 849,476.

PATENTED APR. 9, 1907.

G. N. HINCHMAN.
ADDING MACHINE.
APPLICATION FILED MAR. 24, 1906.

WITNESSES:
Fred H. Henkel.
W. A. Alexander.

INVENTOR
G. N. Hinchman
BY
Fowler & Bryson
ATTORNEYS

No. 849,476.

PATENTED APR. 9, 1907.

G. N. HINCHMAN.
ADDING MACHINE.
APPLICATION FILED MAR. 24, 1906.

WITNESSES:

INVENTOR
G. N. Hinchman
BY
ATTORNEYS

No. 849,476. PATENTED APR. 9, 1907.
G. N. HINCHMAN.
ADDING MACHINE.
APPLICATION FILED MAR. 24, 1906.

WITNESSES:
Fred C. Heuker
W. H. Alexander

INVENTOR
G. N. Hinchman
BY
Fowler & Bryson
ATTORNEYS

No. 849,476. PATENTED APR. 9, 1907.
G. N. HINCHMAN.
ADDING MACHINE.
APPLICATION FILED MAR. 24, 1906.

WITNESSES:
Fred H. Henke
W. A. Alexander

INVENTOR
G. N. Hinchman
BY
Fowler & Bryson
ATTORNEYS

No. 849,476. PATENTED APR. 9, 1907.
G. N. HINCHMAN.
ADDING MACHINE.
APPLICATION FILED MAR. 24, 1906.

WITNESSES
Fred Henke
W. A. Alexander

INVENTOR
G. N. Hinchman
BY
Fowler & Bryson
ATTORNEYS

No. 849,476. PATENTED APR. 9, 1907.
G. N. HINCHMAN.
ADDING MACHINE.
APPLICATION FILED MAR. 24, 1906.

WITNESSES:
W. H. Alexander.
S. G. Stout.

INVENTOR
G. N. Hinchman
BY
Fowler & Bryson
ATTORNEYS

UNITED STATES PATENT OFFICE.

GEORGE N. HINCHMAN, OF WEBSTER GROVES, MISSOURI, ASSIGNOR TO THE STANDARD ADDING MACHINE COMPANY, OF ST. LOUIS, MISSOURI, A CORPORATION OF MISSOURI.

ADDING-MACHINE.

No. 849,476.     Specification of Letters Patent.     Patented April 9, 1907.

Application filed March 24, 1906. Serial No. 307,848.

*To all whom it may concern:*

Be it known that I, GEORGE N. HINCHMAN, a citizen of the United States, residing at Webster Groves, in the county of St. Louis and State of Missouri, have invented a certain new and useful Adding-Machine, of which the following is such a full, clear, and exact description as will enable any one skilled in the art to which it appertains to make and use the same, reference being had to the accompanying drawings, forming part of this specification.

My invention relates to adding-machines, and more particularly to that class of adding-machines described in my prior patents, Nos. 833,388 and 833,389, both of October 16, 1906.

The object of my invention is to provide the machine with a paper support or platen of any desired length, along which the adding and printing mechanism may be moved to coöperate therewith to print the numbers in various columns. I accomplish this result by providing a base with a track or other guide upon which the adding and printing mechanism is adapted to move and carrying upon said base a printing roller or platen for supporting the paper, so that the adding and printing mechanism may be moved longitudinally of said platen, and also by changing the position of the printing mechanism, so that it may properly coöperate with said platen.

In the accompanying drawings, which illustrate one form of machine made in accordance with my invention.

Like marks of reference refer to similar parts in the several views of the drawings.

20 represents the base, upon which is a longitudinally-extending track 21. At the rear end of the base 20 are uprights 22 for supporting the printing roll or platen 23 and operating parts therefor, as will be hereinafter more fully described.

25 is the casing of the adding and printing mechanism. This casing 25 is provided with grooved wheels or rollers 26, which run upon the track 21.

Figure 3:
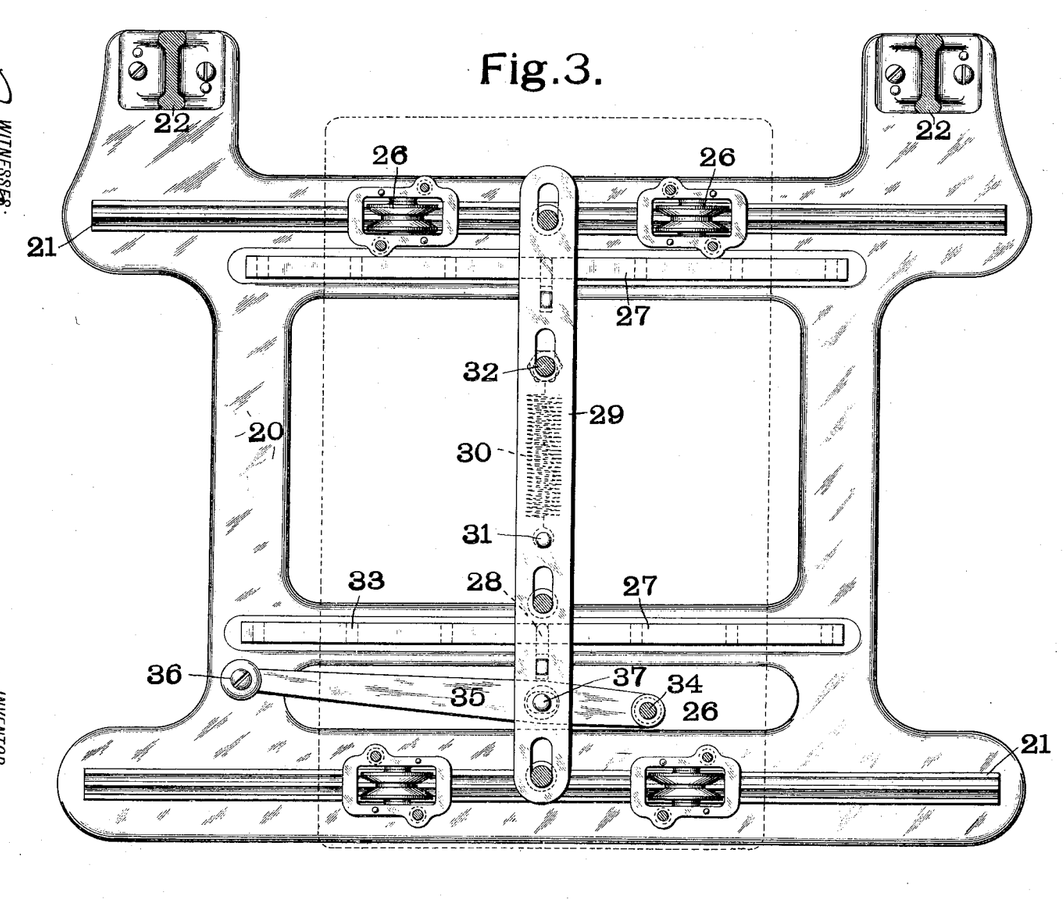
Fig. 3 is a top plan view of the base and mechanism for locking the adding and printing mechanism to the base.

Arranged on the base 20 between the rails of the track 21 are two perforated bars 27, which coöperate with detents 28 on a sliding bar 29, carried on the bottom of the casing 25. A spring 30 is secured at one end to a pin 31, carried on the bar 29, and at the other to a pin 32, rigidly secured to the bottom of the casing 25. Pivoted to the casing 25 at 34 is a lever 35, Fig. 3, projecting at the side of the casing 25 and provided with a handle 36. This lever 35 is connected to the bar 29 by a slot-and-pin connection 37, so that the bar 29 may be moved longitudinally to disengage the detents 28 from the perforation 33 in the bars 27, and thus release the adding and printing mechanism.

Contained within the casing 25 is the adding mechanism, the principal part of which is the same as in my two prior patents hereinbefore referred to, and it will therefore be only briefly described.

Figure 5:
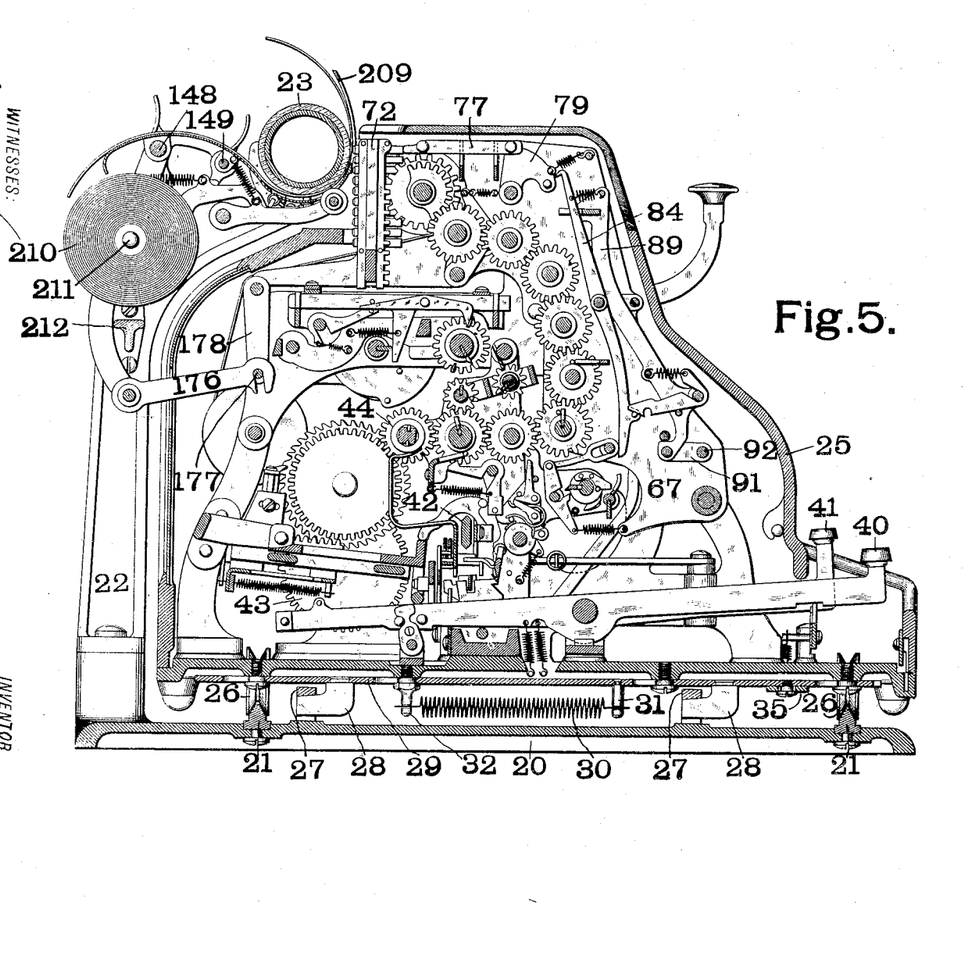
Fig. 5 is a central section through the complete machine.

40 are the numeral-keys, and 41 the order-keys, by means of which the adding mechanism is operated. The order-keys 41 position the carriage 42, Fig. 5, and the numeral-keys 40 govern the transmission of motion from the motor 43 to the laterally-moving gear 44, the lateral movement of which is controlled by the carriage and which transmits rotary movement to the adding mechanism. This laterally-moving gear 44 is adapted to mesh with a set of gears 45, loosely mounted on a shaft 46, which gears in turn mesh with gears 47, loosely mounted on a shaft 48. These gears 47 correspond to the gears to which the printing-wheels are attached in my prior patents. In the present instance, however, they are not provided with printing-wheels. The gears 45 also mesh with idle gears 49, adapted to transfer the numbers to the adding-wheels 50, and the gears 47 are adapted to be brought into mesh with repeat-gears 51 for repeating the number, as described in my prior patent, No. 833,389. The shaft 46, above referred to, is provided with a comb 52, coöperating with a pin 53 on the wheels 45 to return said wheels to zero.

54 is carrying mechanism coöperating with the adding-wheels 50.

The operation of the parts above referred to will be now briefly described.

One of the order-keys 41 is first depressed, so as to move the carriage 42 the proper number of spaces toward the left and so position the sliding gear 44 in the proper order to begin the registration of a number. The numeral-keys 40 are now depressed, and the motor 43 causes the gear 44 to rotate, and thus set up the number in the gears 45 and 47. The adding-gears 50, however, are out of engagement with the gears 49, and the gears 47 are also out of engagement with the train of gears, hereinafter to be described, which operate the printing mechanism. Upon the operation of the keys, therefore, the number is simply set up in the gears 45 and 47 and is neither printed nor accumulated in the adding mechanism. When the handle is pulled, however, the adding-wheels 50 are brought into engagement with wheels 49, so that the return of the wheels 45 and 47 causes the number to be accumulated in the adding mechanism, and at the same time it is transferred to the printing mechanism by means which will be hereinafter described.

Figure 1:
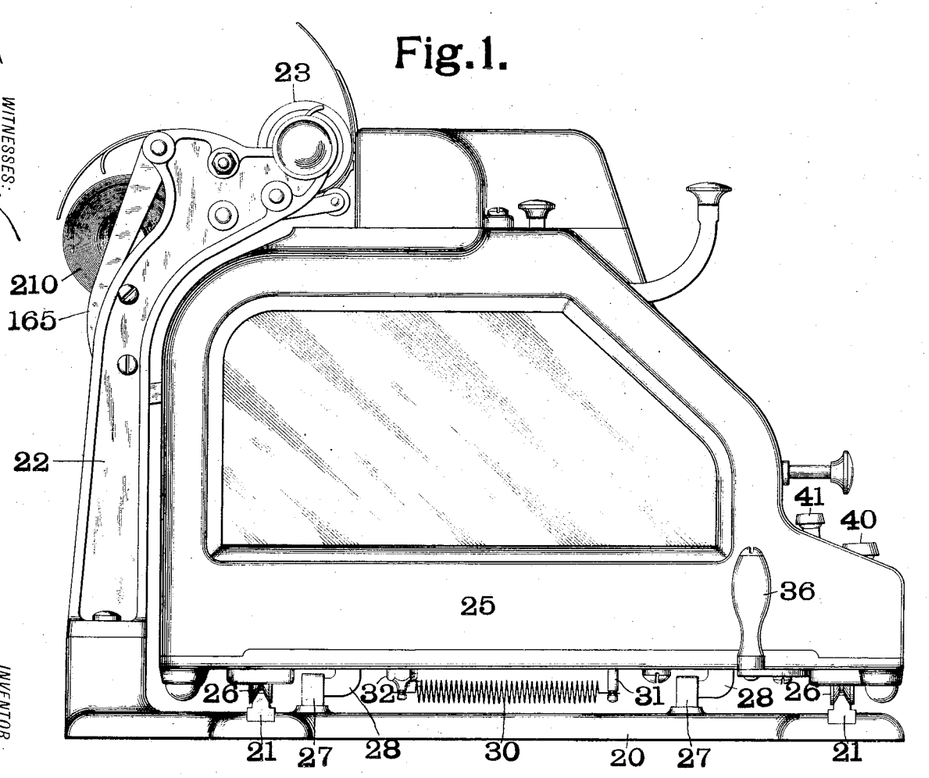
Figure 1 is a side view of the complete machine.
Figure 2:
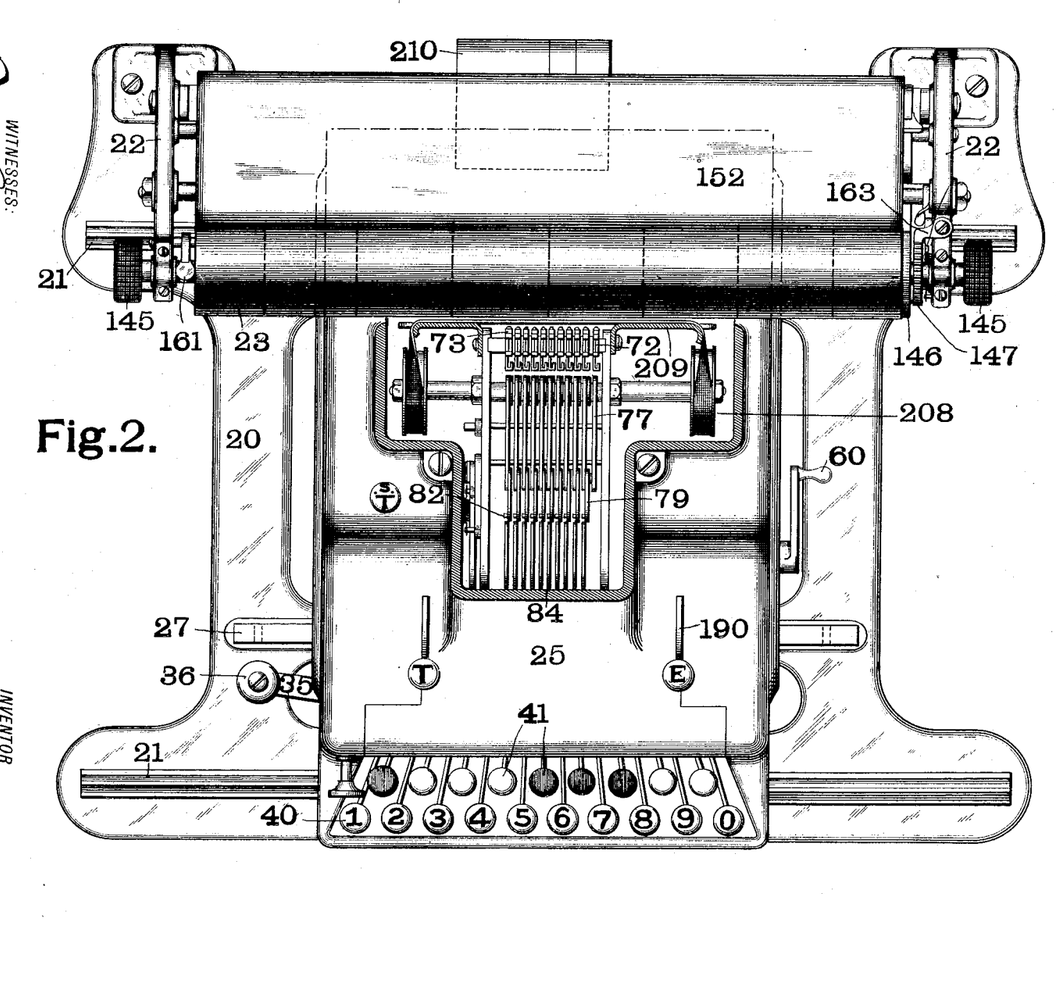
Fig. 2 is a top plan view, a portion of the casing of the adding and printing mechanism being in section.
Figure 9:
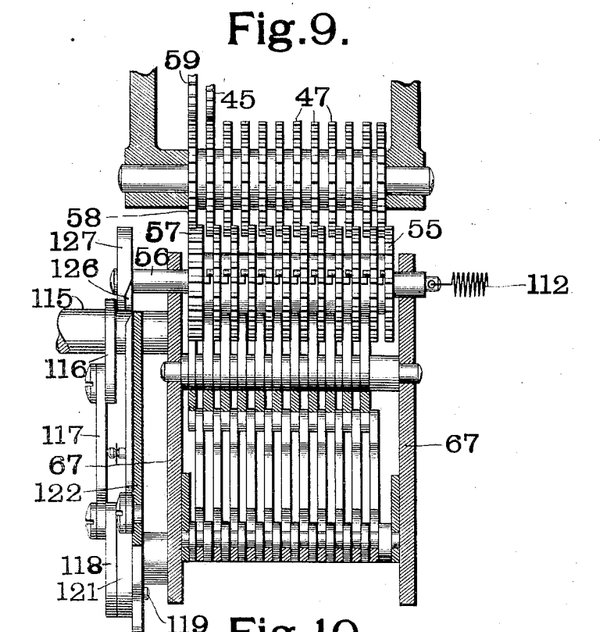
Fig. 9 is a section on the line 9 9 of Fig. 6.
Figure 10:
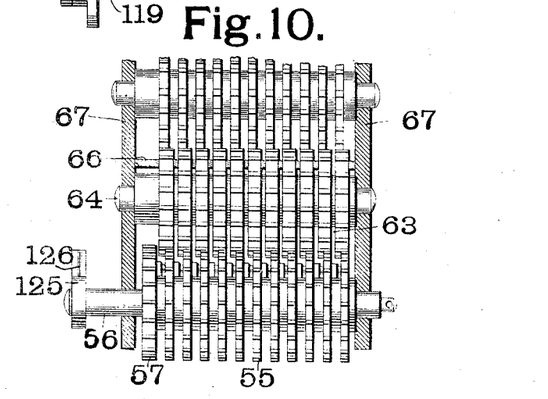
Fig. 10 is a section on the line 10 10 of Fig. 6.

Adjacent to the gears 47 are a set of gears 55, loosely mounted upon a shaft 56. These gears 55 are normally out of mesh with the gears 47, but are adapted to be moved laterally, so as to mesh therewith. Rigidly secured to the shaft 56 is a wide gear 57, Figs. 9 and 10, which meshes with a gear 58, loosely mounted upon the shaft 48 with the gears 47, and this gear 58 in turn meshes with a gear 59, rigidly secured to the shaft 46, which is operated by the pull of the handle 60, Fig. 2. The object of this train of gears 57, 58, and 59 is to rotate the shaft 56, which carries a comb 61, adapted to engage with pins 62, carried in the wheels 55. The gears 55 in turn mesh with wide gears 63, loosely mounted upon a shaft 64. These gears 63 are provided with pins 65, adapted to contact with a fixed comb 66, carried in plates 67, which also serve to carry the shafts 56 and 64.

68 are half-gears loosely mounted upon a shaft 69 and each having secured to it a large gear 70, meshing with a rack 71, carrying a printing-bar 72, in which are movably mounted type 73. In order to transfer the movement from the gears 63 to the half-gears 68, I mount in the plates 67 four shafts 75, upon each of which is loosely mounted a set of idle wheels 76, so that the said idle wheels 76 transfer the movement from the gears 63 to the half-gears 68. The movable type 73 in the type-bars 72 are adapted to be driven into contact with the printing-roll 23 by hammers 77. Each of the hammers 77 is pivoted at its forward end to one end of a link 78, the opposite end of which is loosely mounted upon the shaft 69, and at the other to a link 79, pivoted on a shaft 80, carried in the plates 67. Each of the links 79 is provided with a rearward and downward projection 81, carrying a pin 82. Each of the pins 82 is adapted to be engaged by means of a hook 83 on the end of a lever 84. The levers 84 are pivoted on a shaft 85, carried by links 86, pivoted at 87 to the plates 67. The upper ends of the levers 84 are guided by a comb 88, carried by a pair of levers 89, pivoted on the shaft 85 and also on a shaft 90, carried by links 91, rigidly secured to a rock-shaft 92, journaled in the plates 67. Carried by the levers 89 is a shaft 93, on which are pivoted detents 94, adapted to engage pins 95 on the levers 84. These levers 94 are held in position against the stop 96 by means of springs 97, each secured at one end to an extension of the lever 94 and at the other to a rod 98, carried in the levers 89. Pivoted on a shaft 100 are levers 101, each having a lip 102, adapted to be engaged by a comb 103 in the printing-slide 104. Pivoted to the upper end of each of the levers 101 is a slotted link 105, guided by a shaft 106 and bearing against the lower ends of the levers 84. It is evident that when the printing-slide 104 is positioned by the order-key and operated by the pull of the handle it will move all of the levers 101 corresponding to the orders in which characters are to be printed, and consequently the links 105 of the corresponding orders will operate the levers 84, so as to cause the detents 94 to take over the pins 95, and thus lock these levers in position, so that their links 83 will take over the pins 82 of the corresponding printing-hammers, so that when the levers 84 and 89 are moved downward, as will be hereinafter described, the printing-hammers 77 in the proper orders will be actuated. A stop 107 is arranged in the path of the detents 94, so as to release the said detents at the proper time, and thus release the printing-hammers to print.

108 are the springs for holding the links 79 in their proper position, and 109 the springs for holding the levers 84 in the proper position with relation to the levers 89. The levers 101 are held in normal position by springs 110, secured at one end to the said levers and at the other to a rod 111, carried in the plates 67.

112 is a spring normally holding the shaft 56 to the right.

Figure 4:
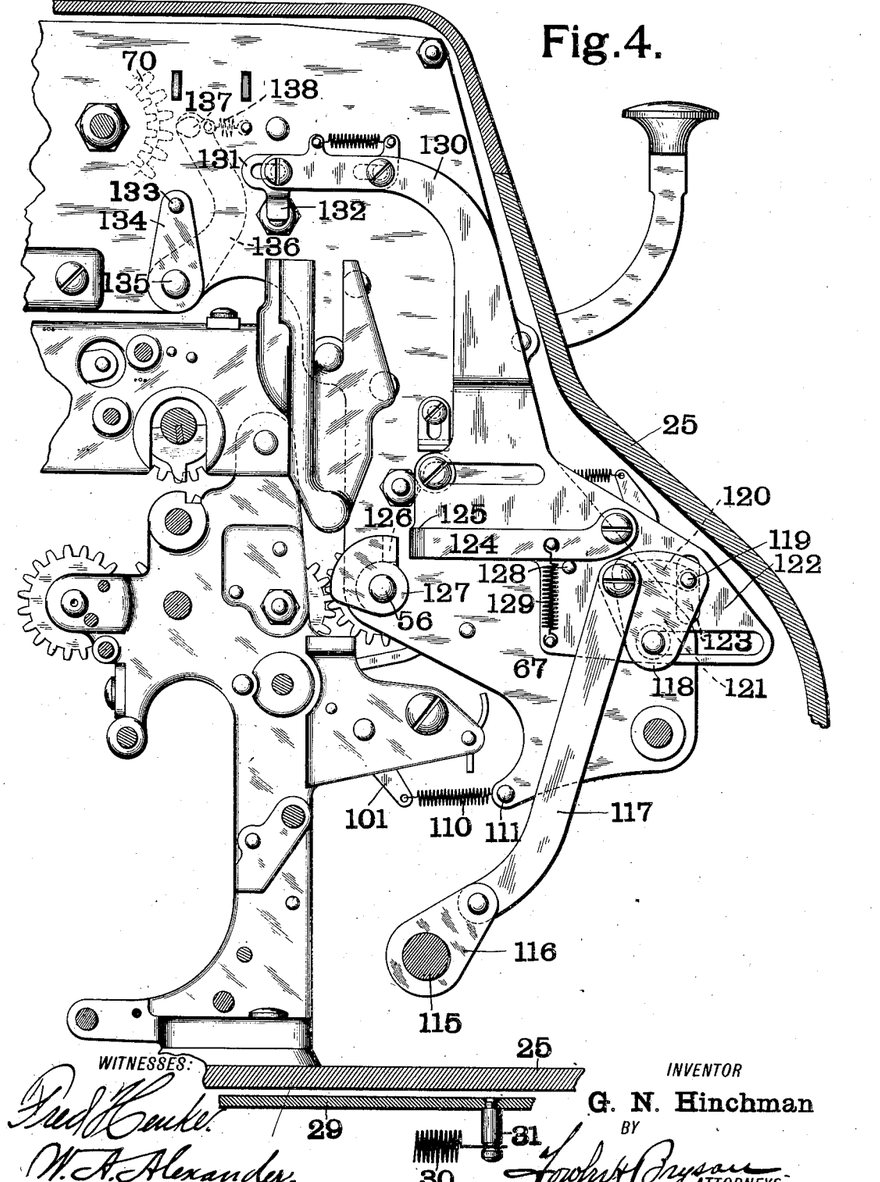
Fig. 4 is an enlarged side elevation of a portion of the frame of the adding and printing mechanism, together with the parts carried thereby, the case being shown in section.
Figure 6:
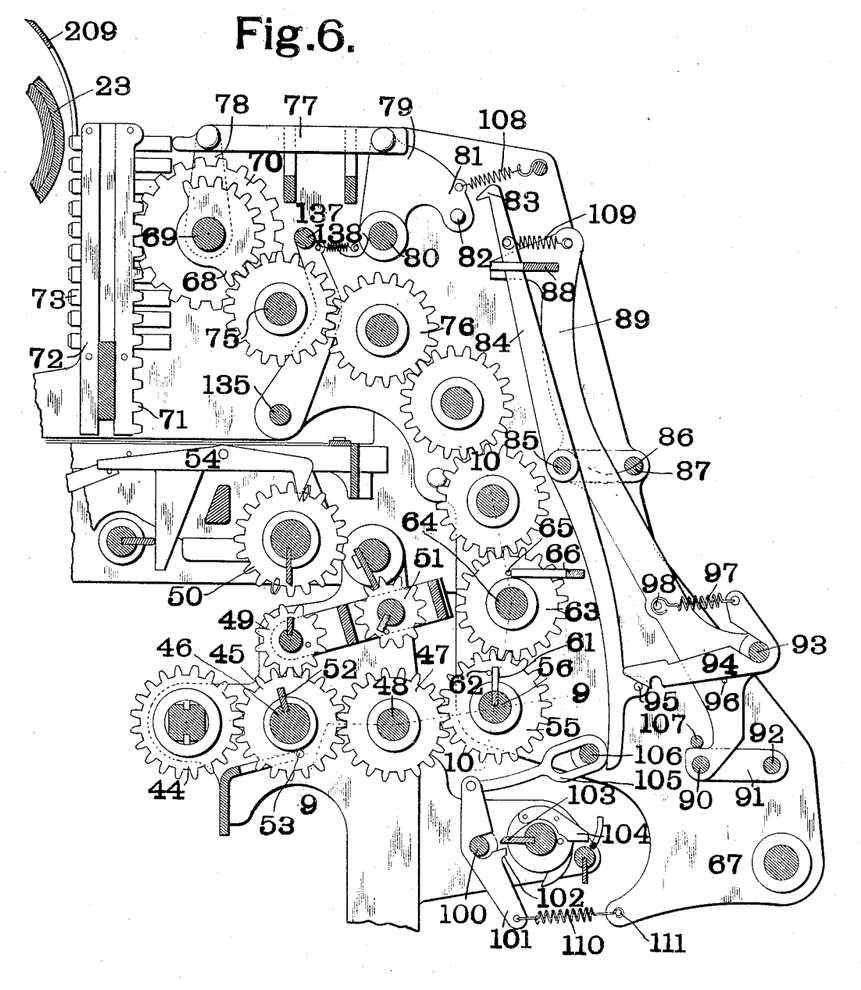
Fig. 6 is an enlarged view of some of the mechanism shown in Fig. 5.

115, Fig. 4, is the handle-shaft operated by the handle 60, hereinbefore referred to. Secured to this shaft 115 is an arm 116, to which is pivoted a link 117. This link 117 is pivoted at the opposite end to a sector 118, loosely mounted on the shaft 92 outside of the plate 67. (See also Fig. 9.) The sector 118 is provided with a pin 119, which passes through a segmental slot 120 in a second sector 121, arranged between the sector 118 and a plate 122, slidingly mounted on the plate 67. The said second sector 121 is rigidly secured to the shaft 92. The pin 119 also passes through a vertical slot 123 in the sliding plate 122. Pivotally mounted on the sliding plate 122 is a bar 124, having a beveled forward end 125, which is adapted to engage with a beveled face 126 on a cam-block 127, rigidly mounted on the shaft 56. The bar 124 is normally held in position against a stop 128 by a spring 129. The plate 122 is provided with an upward and rearward extension 130, upon which is yieldingly mounted a plate 131, having a downward extension 132, adapted to come in contact with a pin 133 on an arm 134. This arm 134 is rigidly secured to a shaft 135, (see also Fig. 6,) journaled in the plates 67. Rigidly secured to the shaft 135 inside of the plate 67 are a pair of arms 136, carrying a centering-pawl 137, adapted to be brought into engagement with the wheels 70, so as to center them, and thus preserve the alinement of the type 73. The centering-pawl 137 is held in its normal position by means of a spring 138.

It will be evident that when the handle-shaft 115 is rotated its movement will be communicated, through the arm 116 and link 117, to the sector 118. The first effect of this movement will be to swing the sector 118 on the shaft 92, upon which it is loosely mounted. The pin 119, however, extending through the slot 120 into the slot 123, will, because of its engagement with the edge of said slot 123, move the plate 122 toward the rear. As soon as the beveled edge 125 of the bar 124 comes in contact with the beveled edge 126 on the cam-block 127 the shaft 56 will be rotated so as to bring the pins 62 in the wheels 55 firmly against the comb 61, so as to aline all the wheels 55. After this the cam action of the two bevels 125 and 126 will move the shaft 56 laterally, so as to bring the wheels 55 into engagement with the wheels 47. Prior to this the wheels 48 have been rotated by means of the laterally-moving gear 44 while the said wheels 48 were out of contact with the wheels 55. The latter movement above described, however, will bring the gears 55 into mesh with the gears 48, so that when the wheels 48 are returned by the movement of the wheels 45 the number will be transferred, through the gears 55, 65, 76, and 68, to the gears 70, which control the printing-bars 72. After the printing-bars are positioned the downwardly-projecting detent 132 will come into contact with the pin 133, and thus throw the centering-pawl 137 into engagement with the wheels 70 to aline the type. After this the pin 119 will come in contact with the end of the slot 120 in the sector 121 and move the said sector. This sector being rigidly secured to the shaft 92 will rotate the same and through the links 91 swing the levers 89 downward, so as to operate the hammers 77 in the manner hereinbefore described.

Figure 7:
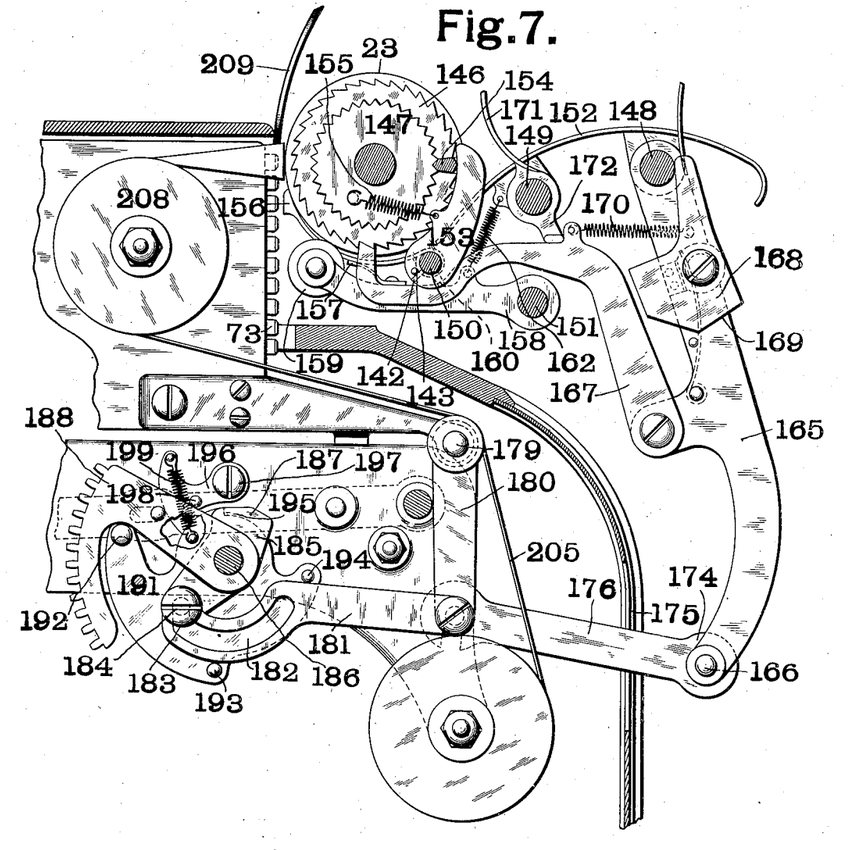
Fig. 7 is an enlarged view showing the mechanism for operating the printing roll or platen.
Figure 8:
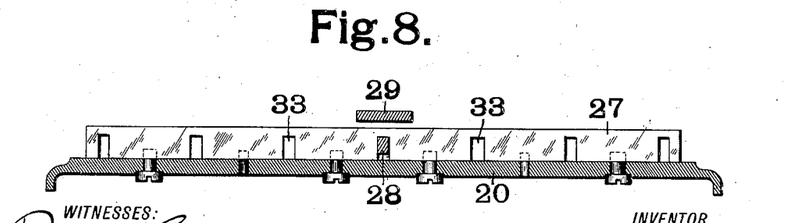
Fig. 8 is a section showing a detail view of the mechanism for locking the adding and printing mechanism to the base.

The uprights 22, carried on the base 20, as hereinbefore described, have journaled in their upper ends the printing-roll 23, Figs. 1, 2, 5, and 7. The shaft of this printing-roll 23 is provided at its ends with milled heads 145, by means of which the roll may be manually rotated. The right-hand end of this shaft is also provided with a ratchet-wheel 146 and a star-wheel 147. The uprights 22 are also provided with shafts 148, 149, 150, and 151. The shaft 148 supports a paper-guide 152, which terminates adjacent to the paper-roll 23. Loosely mounted on the shaft 150 is an arm 153, which bears against a centering-pawl 154, which engages with the star-wheel 147 to properly position the roll 23. The pawl 154 is pivoted to the frame 22 at 163, Fig. 2. The arm 153 is held in position by a spring 155, Fig. 7, secured at one end to the said arm and at the other to the upright 22. A pin 142 on the shaft 150 engages a pin 143 on the arm 153 for releasing the pawl 154. The shaft 150 also has loosely mounted on it an apron 156 for holding the paper in contact with the roll 23. The apron 156 is held against the roll 23 by means of springs 157, carried on arms 158, loosely mounted on the shaft 151. The arms 158 also carry feed-rolls 159, which assist the apron 156 in holding the paper against the roll 23. The shaft 150 is also provided with a cam-blade 160, bearing on the top of the arms 158, and at the left-hand end with a thumb-piece 161, by means of which the shaft may be rotated to throw the detent 154 out of engagement with the star-wheel 147 and also to throw the apron 156 and feed-rolls 159 out of engagement with the roll 23. The arms 158 are held in their normal position by means of a spring 162, secured at one end to one of the said arms and at the other to the paper-guide 152. Loosely mounted on the shaft 148 are a pair of arms 165, united at their lower ends by a shaft 166, the said arms and shaft together forming a feed-cradle. Pivoted to the right-hand arm 165 is a feed-pawl 167, the end of which engages with the teeth on the ratchet-wheel 146. The feed-pawl 167 is adapted to come in contact with a stop-piece 168, secured to the right-hand arm 165. This stop-piece 168 is provided with three faces 169, so that three different feeds may be obtained by moving the said stop-piece 168. The feed-pawl 167 is held in its normal position by means of a spring 170, and the shaft 149 is provided with a finger-piece 171, having a cam projection 172 for throwing the feed-pawl 167 out of engagement with the ratchet-wheel 146. The shaft 166, carried by the arms 165, slides in a hub 174 on the end of a link 175. This link 175 extends through a slot 176 in the center of the rear end of the casing 25, and its inner end is hooked over a rod 177, Fig. 5, carried by arms 178, rigidly secured to a shaft 179, journaled at the upper end and rear end of the machine-frame within the casing 75. This shaft 179 has projecting downwardly at its right-hand end an arm 180. This arm 180 has pivoted to its lower end a link 181, provided with a curved slot 182, having an upward extension 183, as shown in Fig. 7. Projecting through the upward extension 183 of the slot 182 is a pin 184, carried in the end of an arm 185, rigidly secured to a shaft 186, which is operated upon the pull of the handle 60. This arm 185 is also provided with a cam-face 187 for purposes hereinafter to be described. The shaft 186 also has loosely mounted upon it a toothed sector 188. This sector 188 is provided with a pin 189, engaging a slot in the error-key bar 190. Loosely mounted on the shaft 186, adjacent to the arm 185, is a sector 191. This sector 191 is provided with three pins 192, 193, and 194. The pin 192 projects below the toothed sector 188. The pin 193 engages the lower edge of the lever 181, and the pin 94 engages the upper edge of said lever. The sector 191 is also provided with a tooth 195, adapted to be engaged by a detent 196, pivoted to the machine-frame at 197. The detent 196 is also provided with a pin 198, adapted to be engaged by the cam 187 on the arm 185. The detent 196 is held in its normal position by means of a spring 199, secured at one end to the said detent and at the other to the sector 191.

The inking-ribbon 205 is actuated by ribbon-spools 206 in the ordinary manner. Passing from the ribbon-spools 206 the ribbon passes over small guide-wheels 207 and large guide-wheels 208. From the large guide-wheels 208 the ribbon passes over a ribbon-guard 209 between the type 73 and the paper-roll 23. If it is desired to use narrow paper, a roll 210 of the same may be wound on a shaft 211, carried in a support 212, arranged between the uprights 22.

In the ordinary operation of the machine when the handle is pulled forward the shaft 186 is rotated, and consequently the arm 185 is moved, as the said arm is rigid upon said shaft. This causes the pin 184, which is in engagement with the upward extension 183 of the wheel 182, to force the link 181 backward, the pins 193 and 194 acting as guides for said link. The movement of the link 181 is communicated by the arm 180 to the shaft 179 which thus swings the cradle formed of the arms 178 and rod 177. As the link 176 is in engagement with the rod 177, the said link is moved toward the rear, thus swinging the cradle formed of the arms 165 and rod 166. This moves the feed-pawl 167 to the rear, the end of the pawl following the outline of the teeth on the ratchet-wheel 146 until the said pawl comes in contact with the stop 168, after which its movement toward the lever 165 will be arrested, and consequently its forward end will be swung downward and backward away from the wheel 146. According to the position of the stop 167 the pawl will follow the outline of one, two, or three teeth. Upon the return of the handle the parts will again resume their normal position, and the feed-pawl 167 will engage with the wheel 146, and thus feed it through one, two, or three teeth, according to the position of the stop 168. When the error-key 190 is operated, the sector 188 will be swung upon the shaft 186 and owing to its engagement with the pin 192 will operate the sector 191. The pin 193 will follow the curve on the lower edge of the bar 181 until it strikes a straight portion of said portion, when it will raise the said bar, so as to move the pin 184 out of the upward extension 183 into the main or curved part of the slot 182. At the same time the detent 196 will engage with the tooth 195 on the sector 191 and lock the sector in this position, so that it will remain after the return of the sector 188. When the handle is now drawn forward and the arm 185 operated, the pin 184 will move in the curved part of the slot 182 without moving the link 181, and consequently the paper-feed mechanism will not be operated. Upon the completion of the stroke the cam 187 on the arm 185 will strike the pin 198, and thus release the sector 191, so that it may return to its normal position. By moving the finger-piece 171 the feed-pawl 167 may be moved out of engagement with the ratchet-wheel 164, so as to prevent the feeding of the paper at any time. The apron 156 and feed-roll 159 can also be moved out of engagement with the roll 23 at any time by the movement of the finger-piece 161.

Figures 11, 12, 13:
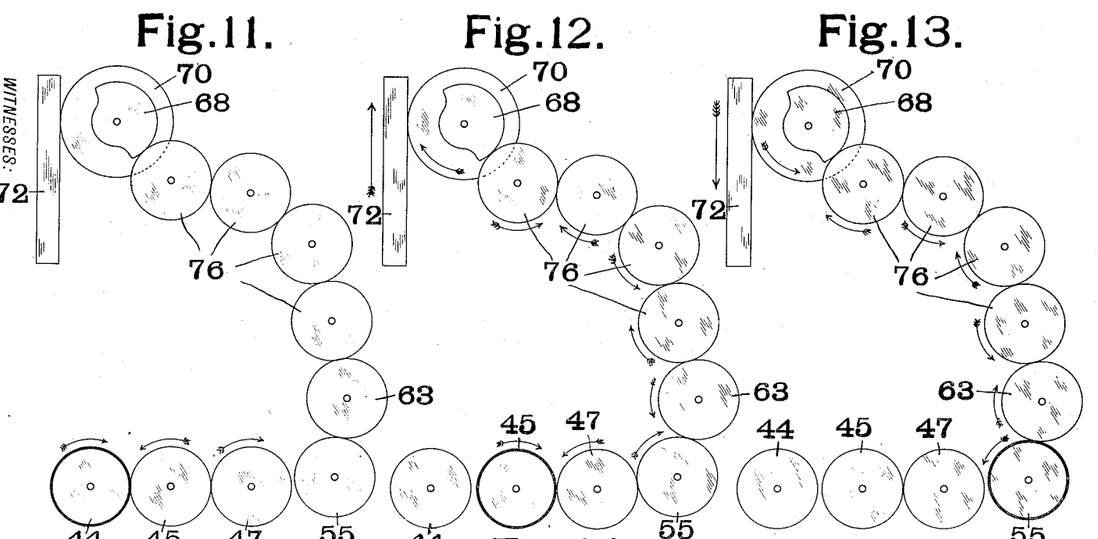
Figs. 11, 12, and 13 are diagrammatic views showing the movements of the various gears in the machine.
Figure 14:
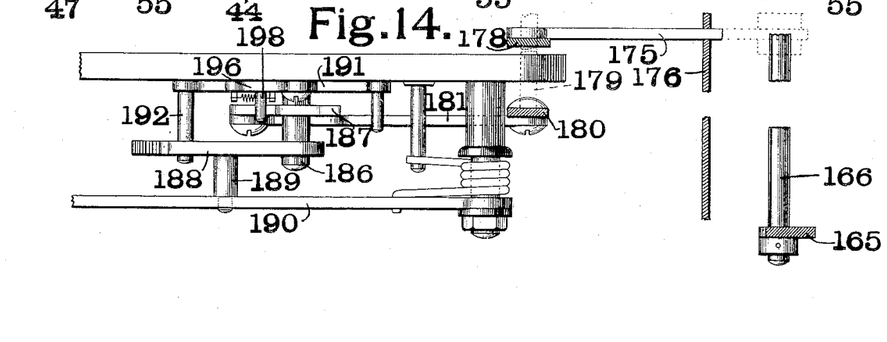
Fig. 14 is a top plan view of the mechanism for controlling the printing-roll shown in Fig. 7.

The operation of my machine is as follows: The numbers are written into the machine in the usual manner by means of the numeral-keys 40 after the carriage has first been positioned by means of the order-keys 41. The positioning of the carriage also positions the printing-slide 104 in the usual manner. When the number is written into the machine by means of the numeral-keys 40, the laterally-moving gear 44 communicates the movement of the keys through the wheels 46 to the wheels 48. These wheels 48, however, are out of engagement with the wheels 55, so that the wheels 55 65 76, &c., are not operated when the number is written into the machine. Upon the pull of the handle 60 the first movement is communicated through the arm 116 and shaft 117, Fig. 4, to the sector 118. At the same time the printing-slide 104 is operated to cause its comb 103 to engage with the teeth 102 of the pawls 101 in all the orders in which printing is to take place, and thus cause the links 105 to move the levers 84, so that their pins 95 are engaged by the detents 94, and consequently their hooks 83 locked in position to engage with the pins 82 on the printing-hammer levers 79. The first movement of the link 117 causes the sector 118 to be rotated on the shaft 92, and this movement is communicated through the pin 119 to the sliding plate 122, causing said plate to slide toward the rear of the machine. When the cam-bar 124 on said plate comes in contact with the cam-block 127 on the shaft 56, the said block tends to rotate the shaft 56, and consequently the comb 61 in said shaft comes in contact with the pin 62 on the wheels 55, thus moving the pins 65 in the wheels 63 firmly against the fixed comb 66, so as to aline the wheels, after which the action of the cam-pieces 125 and 126 moves the shaft 56 to the left, thus causing the wheels 55 to engage with the wheels 48. The movement of the handle now rotates the shaft 46, and consequently the wheels 45 of all the orders in which numbers have been written. This movement is communicated through the wheels 48 to the wheels 55 and thence through the wheels 63 and 76 and the half-wheels 69 to the wheel 70, which operates the type-bars 72, so that said type-bars are moved upward, as shown in the diagram in Fig. 12. At the same time the shaft 56 is rotated by means of the train of gears 57, 58, and 59, so that its comb 61 moves in the direction of the arrow in Fig. 6, said comb being followed by the pins 62 of all the orders in which numbers have been written. The comb itself moves through a distance equal to ten-tenths of the wheel 65, while the pins 62 move a distance corresponding to the value of the digit written into the machine in the given order. After the type-bars 72 have been thus positioned the downward projection 132, Fig. 4, comes in contact with the pin 133, and the centering-pawl 137 is thrown into engagement with the teeth of the wheel 70, so as to properly center the type 73. During this transmission of the movement the pin 119 comes in contact with the end of the slot 120 in the sector 121 and moves the said sector, which being rigidly secured to the shaft 92 rocks the said shaft, so as to draw the arms 89 downward. This causes the hooks 83 of all the levers 84 which have been moved by the links 105 to engage the pins 82 of the corresponding hammers, and consequently to withdraw the hammers against the tension of the spring 108. When the limit of the forward movement of the handle is reached, the detents 94 will come in contact with the stop-bar 107, so as to release the levers 84, and consequently the hammers 77, so that the hammers deliver a printing-blow to the type, because of the tension of the springs 108. When the end of this forward stroke is reached, the cam 127 is moved in such a position that it can slide under the bar 124, so that the wheels 55 move laterally out of engagement with the wheels 48. Upon the return of the handle the pins 62 of all the wheels 65 which have been rotated are engaged by the comb 61 on its return movement, and consequently the type-bars 72 are returned to their normal position, as shown diagrammatically in Fig. 13. Upon this return movement the cam-block 172 simply lifts the bar 124 against the pressure of the spring 129. The operation in taking the total, subtotal, or repeating a number is in all respects the same as when writing in a number in so far as the present invention is concerned, and consequently no further description is necessary of these operations. The operation of the paper-feeding device has been fully hereinbefore described.

Having fully described my invention, what I claim as new, and desire to secure by Letters Patent of the United States, is—

1. In a tabulator, the combination with a paper-roll, of adding and printing mechanism moving longitudinally of said paper-roll and coöperating therewith to print numbers, means for operating said paper-roll, and an error-key for said adding and printing mechanism, said error-key also preventing the operation of said paper-roll.

2. In a tabulator, the combination with a paper-roll, of adding and printing mechanism movable longitudinally of said paper-roll and coöperating therewith to print numbers, means for operating said paper-roll from said adding and printing mechanism, and an error-key for said adding and printing mechanism, said error-key also preventing the operation of said paper-roll.

3. In a tabulator, the combination with a paper-roll, of adding and printing mechanism provided with an operating-handle and movable longitudinally of said roll, means for operating said roll from said handle, and an error-key for said adding and printing mechanism, said error-key also preventing the operation of said roll.

4. In an adding-machine, the combination with mechanism in which a number may be set up, separate mechanism for registering the number, and longitudinally-movable gears for connecting and disconnecting said mechanisms.

5. In an adding-machine, the combination with mechanism in which a number may be set up, of mechanism for registering the number, a handle for operating said second mechanism, and longitudinally - movable gears for connecting and disconnecting said mechanisms.

6. In an adding-machine, the combination with mechanism in which a number may be set up, of separate mechanism for registering the number, said second mechanism including printing devices, and longitudinally-movable gears for connecting and disconnecting said mechanisms.

7. In an adding-machine, the combination with mechanism in which a number may be set up, of separate mechanism for registering the number, said second mechanism including printing devices, a handle for operating said second mechanism, and longitudinally-movable gears for connecting and disconnecting said mechanisms.

8. In an adding-machine, the combination with mechanism in which a number may be set up, of printing mechanism, connections between said printing mechanism and said first-named mechanism and adapted to be moved into and out of engagement with the latter, and means for centering said connections while out of engagement with said first-named mechanism.

9. In an adding-machine, the combination with mechanism in which a number may be set up, of printing mechanism, connections between said printing mechanism and first-named mechanism and adapted to be moved into and out of engagement with the latter, means for centering said connections while out of engagement with said first-named mechanism, and separate means for centering said printing mechanism after said connections have been moved into engagement with said first-named mechanism.

10. In an adding-machine, the combination with mechanism in which a number may be set up, of printing mechanism, a train of gears for connecting said printing mechanism and said first-named mechanism and adapted to be moved into and out of engagement with the latter, and means for centering the connecting end of said train of gears while the same is out of engagement with said first-named mechanism.

11. In an adding-machine, the combination with mechanism in which a number may be set up, of printing mechanism, a train of gears connecting said printing mechanism and said first-named mechanism and adapted to be moved into and out of engagement with the latter, means for centering the connecting end of said train of gears while the same is out of engagement with said first-named mechanism, and separate means for centering the opposite end of said train of gears to aline the printing mechanism after said train of gears has been moved into an engagement with said first named mechanism.

12. In an adding-machine, the combination with mechanism for setting up a number, of printing mechanism normally out of engagement with said first-named mechanism, connections between said printing mechanism and said first-named mechanism and normally out of engagement with the latter, and means for centering said connections while out of engagement with said first-named mechanism.

13. In an adding-machine, the combination with mechanism for setting up a number, of printing mechanism normally out of engagement with said first-named mechanism, connections between said printing mechanism and first-named mechanism and normally out of engagement with the latter, means for centering said connections while out of engagement with said first-named mechanism, and separate means for centering said printing mechanism after said connections have been moved into engagement with said first-named mechanism.

14. In an adding-machine, the combination with mechanism for setting up a number, of printing mechanism, a train of gears for connecting said printing mechanism and first-named mechanism and normally out of engagement with the latter, and means for centering the connecting end of said train of gears while the same is out of engagement with said first-named mechanism.

15. In an adding-machine, the combination with mechanism for setting up a number, of printing mechanism, a train of gears for connecting said printing mechanism and first-named mechanism and normally out of engagement with the latter, means for centering the connecting end of said train of gears while the same is out of engagement with said first-named mechanism, and separate means for centering the opposite end of said train of gears to aline the printing mechanism after said train of gears has been moved into engagement with said first-named mechanism.

16. In an adding-machine, the combination with mechanism for setting up a number, of printing mechanism, connections between said printing mechanism and said first-named mechanism consisting of a plurality of sets of gears forming a train, and means for centering the connecting set of said gears, said means also shifting said gears longitudinally to move the same into engagement with said first-named mechanism.

17. In an adding-machine, the combination with a mechanism for setting up a number, printing mechanism, hammers for said printing mechanism, a plurality of members controlled by the movement of the handle, levers pivoted to said members and controlled by said first-named mechanism and adapted to engage said hammers, and means for releasing said levers.

18. In an adding-machine, the combination with printing devices, of a platen coöperating therewith, a feed-pawl for said platen, a member for operating said feed-pawl and provided with a curved slot, and an arm operated by the pull of the handle and provided with a pin adapted to work in said slot.

19. In an adding-machine, the combination with printing devices, of a platen coöperating therewith, a feed-pawl for said platen, a member for actuating said feed-pawl and provided with a curved slot, an arm operated by the pull of the handle and having a pin adapted to work in said slot, a guide for preventing the pin from working in said slot, and an error-key for moving said guide.

20. In an adding-machine, the combination with printing devices, of a platen therefor, a feed-pawl for said platen, a member for operating said feed-pawl and provided with a curved slot, an arm actuated by the pull of the handle and provided with a pin adapted to work in said slot, a guide for preventing said pin from working in said slot, an error-key for moving said guide, a detent for said guide, and means for releasing said detent.

21. In an adding-machine, the combination with printing devices, of a platen coöperating therewith, a feed-pawl for said platen pivoted to a movable member, a stop carried by said member and having a plurality of faces adapted to coöperate with said feed-pawl, and means for operating said member by the pull of the handle.

In testimony whereof I have hereunto set my hand and affixed my seal in the presence of the two subscribing witnesses.

G. N. HINCHMAN. [L. S.]

Witnesses:
W. A. ALEXANDER,
BENNETTE PIKE.